June 20, 1961     A. A. PRESTON, SR     2,988,833
TRACK CLEANING MEANS FOR RAILWAY CARRIAGES
Filed Oct. 7, 1960     2 Sheets-Sheet 2
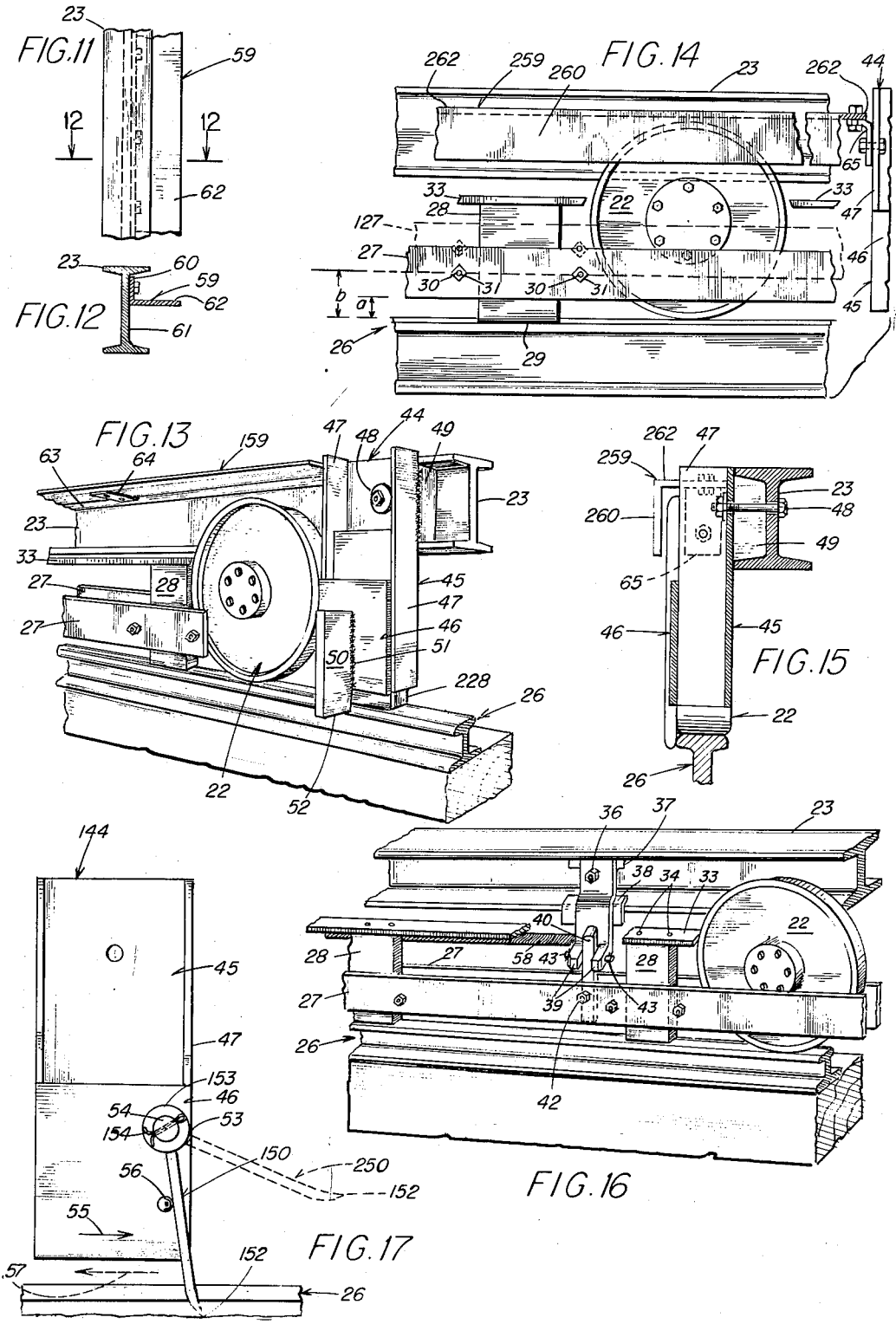

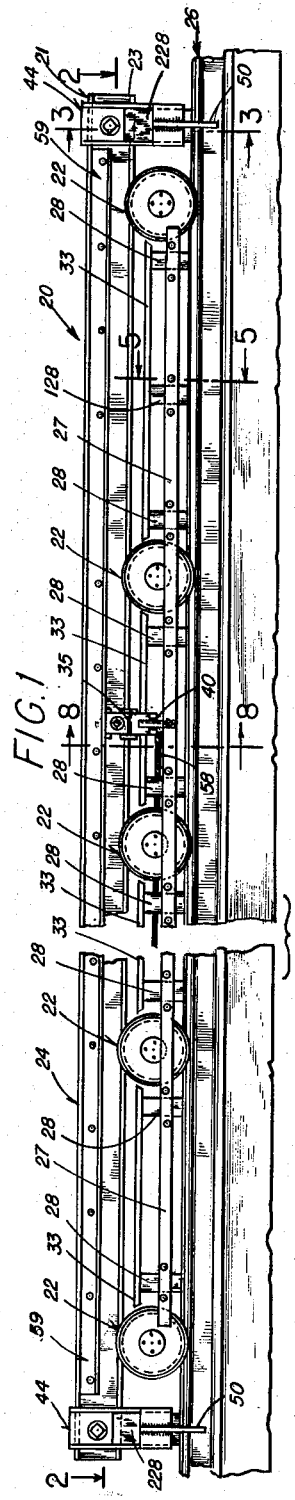

United States Patent Office 2,988,833
Patented June 20, 1961

2,988,833
TRACK CLEANING MEANS FOR RAILWAY CARRIAGES
Arthur A. Preston, Sr., P.O. Box 433, Aberdeen, Miss.
Filed Oct. 7, 1960, Ser. No. 61,293
11 Claims. (Cl. 37—194)

The present invention relates to track cleaners for railway carriages and, more particularly, to such devices to keep clear the rails of tracks for sawmill log carriages.

In sawmills which saw up logs into lumber conventional equipment may include a conveyor-equipped feed chute which successively delivers logs through cleaning sprays to a loading deck in the mill. Although such spray cleaning is helpful, it does not always clear away most of the dirt and loose pieces of bark clinging to the logs. When each log is transferred from the loading deck to the log carriage by the usual hydraulically operated nigger, it is roughly handled and much of the dirt and loose bark clinging thereto is dislodged to fall to the track for the carriage, fouling up the rail on the near side thereof adjacent the loading deck. The nigger beam and log-turning dogs carried thereby, in slapping against and digging into the log during the transfer of the log to the carriage, also dislodge more dirt and dust and break and tear away additional pieces of bark, and these are added to the track fouling refuse. After the log is loaded on the carriage and clamped upon its air set works by the air operated clamping dogs, the log is moved out to the near side of the carriage so that an overhanging portion may be carried forward slowly by the carriage into the band saw for sawing a slab therefrom. The clamped log may then be moved back from the saw cutting plane by offset structure, and in any event the carriage is quickly returned to the nigger so that the latter may flip the log over to permit sawing off successively slabs from four oposite sides to produce a square timber, from which the boards are then successively cut by similar operations. In some mills the boards are successively sawed from one side of the log without first producing a square timber, bark edges of boards being trimmed off later by circular trimming saws. The sawing operations produce additional track-fouling refuse in the form of chunks or large slivers of wood and segments or sections of knots. If the rail is not systematically cleared of these objects the very heavy loaded carriage in making its thousands of daily trips over the fouled track rails rides bumpily along to cause, particularly during its return rapid travels from the saw to the nigger and loading deck, damage to the top rail riding surfaces and the wheel rims; and the rough carriage travel is discomforting and possibly hazardous to the riders who operate thereon the air set works and clamping dogs.

The problem has long been recognized and many different types of track cleaners have been devised. Unfortunately, these prior efforts have not been wholly satisfactory, due to excessive cost of the complicated structures thereof and/or inefficient operation, and many employ metal parts which are rapidly dragged along the rails in the speedy travel of the carriages, causing rapid destructive wear of the rails and consequential damage to the wheels. The present invention has for a general object the effective solution of these problems in an economical manner, and is based on the principle of efficiently keeping the rails clear of the heavy or lumpy refuse and guarding the wheels from that which otherwise would fall thereon.

The sawing operations also produce some loosened fine dirt or dust and sawdust fines which may have a tendency to be thrown inwardly, beneath guard structure provided, upon the top of the near rail and the wheel rims. Such fines contain pitch and some moisture that act as strong cementing agents for the fines when heavily compressed between the near rail top surface and the rims of the wheels riding thereover during the great number of daily trips. As a result, relatively thin uniform coatings of such heavily compressed and cemented fines, when free of the heavy chunks and lumpy refuse, are built up on these wheel rims and rail surface, which have been found to be advantageous. Such uniform cemented coatings of fines provide protective surfacings that prevent damaging metal-to-metal wear, thus assuring much longer life of track rails and wheels. It is thus an additional object of the present invention to provide such track cleaning means which efficiently segregates the damaging chunks and lumpy refuse from the advantageous fines, keeping the rail clear of the former while assuring the laying down of smooth uniform coatings of the latter and transfer thereof to the wheel rims for advantageous protection against undue wear.

Another object of the invention is to provide such track cleaning means which drags over the steel rails refuse clearing blocks of fibrous material that cause no wear of the rails but to the contrary are worn down themselves, while being readily adjustable and replaceable to accommodate the block wear.

A further object of the invention is to provide such means in the form of a floating drag assembly loosely connected to such a carriage and biased to a rail by its own weight which is kept free from contact with the wheels so as effectively to avoid any tendency to grab or be jammed between wheels and rail.

Still other objects of the invention are to provide such devices which may be used to advantage for railway tracks and carriages generally as well as sawmill equipment, and structural embodiments thereof which may be readily constructed and will permit efficient use and operation thereof, particularly in sawmills.

Other objects of the invention will in part be obvious and will in part appear hereinafter.

The invention accordingly comprises the features of construction, combinations of elements and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 1 is a side elevational view to relative small scale, with parts broken away, of a sawmill log carriage equipped with features of an embodiment of the present invention, showing this structure transportably mounted upon supporting rail means;

FIG. 2 is a transverse sectional view, with parts broken away and omitted, of the carriage side structure shown in FIG. 1, and taken substantially on line 2—2 of the latter;

FIG. 3 is an enlarged transverse vertical section of carriage end units for refuse cleaning shown at opposite ends of FIGS. 1 and 2, taken substantially on line 3—3 of FIG. 1, featuring side raker blade means;

FIG. 4 is a top detail view of the structure shown in FIG. 3, with parts broken away;

FIG. 5 is a sectional view to enlarged scale, taken substantially on line 5—5 of FIG. 1, illustrating rail-sweeping drag block and floating support structure of the present invention;

FIG. 6 is a side elevational detail of the structure shown in FIG. 5, with parts broken away;

FIG. 7 is a top view of the drag block and floating support means of the FIGS. 5 and 6 structure;

FIG. 8 is an enlarged sectional view taken substantially on line 8—8 of FIG. 1, showing a lost motion or loose connection between the carriage frame structure and the drag block assembly;

FIG. 9 is a top detail of the structure shown in FIG. 8, with parts broken away;

FIG. 10 is an enlarged side elevational view, with parts broken away, of a portion of the carriage structure and rail means supporting it shown in FIGS. 1 to 9 incl., illustrating parts of the drag block assembly and lost motion or loose connection means of FIGS. 8 and 9;

FIG. 11 is an enlarged top detail of the carriage frame sill structure and an associated wheel overhead guard ledge illustrated in FIG. 1, with parts broken away;

FIG. 12 is a transverse section taken substantially on line 12—12 of FIG. 11;

FIG. 13 is a perspective view of a portion of the end of a carriage similar to that depicted in FIGS. 1 to 10 incl., but illustrating the employment of a different form of overhead protective guard ledge mounted above the wheels;

FIG. 14 is an enlarged side elevational view, with parts broken away and in section, of side structure of the carriage shown in FIGS. 1 to 10 incl., but illustrating a further modified form of the overhead protective guard ledges illustrated in FIGS. 11 to 13 incl.;

FIG. 15 is a transverse elevational section, with parts broken away, of structure shown in FIG. 14, and omitting side raker blade means, showing an end view of the overhead guard ledge structure illustrated in that figure;

FIG. 16 is a perspective view of the structure shown in FIG. 10, for a better understanding of the lost motion or loose connection means employed to tie the drag block assembly to the carriage frame structure; and FIG. 17 is an enlarged side elevational view of a modified form of the drag block and side raker blade structure illustrated in FIGS. 3 and 4.

Referring to the drawings, in which like numerals identify similar parts throughout, it will be seen that the sawmill log carriage illustrated by way of example therein comprises a carriage structure 20 having frame means 21 suitably supported upon a plurality of rail-riding wheels 22. The frame structure 21 may comprise a pair of laterally-spaced, longitudinally-extending side sills 23, each of which may be in the form of a steel I-beam, and such cross-beams as may be necessary or desired to support therewith a suitable lateral deck structure 24. Frame means 21 is suitably supported by a plurality of longitudinally-spaced sets of paired wheels, with each pair, if desired, being connected together by a transverse axle 25 (part of each being indicated in dotted lines in FIG. 2). Such paired wheels provide a relatively large group of longitudinally-spaced and aligned wheels on each side of the frame means, one such side group being illustrated at 22 in Figs. 1 and 2. Sawmill log carriages commonly are provided with five such sets of paired wheels 22, but, of course, may employ a greater number if desired, as is indicated by the breakout in FIGS. 1 and 2. Although the side groups of wheels 22 on both sides of the carriage 20 may be equipped with similar drag cleaning means of the present invention, as might be the case for carriages designed for different services, the most important side group is that which faces the observer from the nigger and log deck side of the equipment, or those which are illustrated in FIGS. 1 and 2, which ride along the near side rail 26. Thus the following description and the claims are directed to the track cleaning means which is associated with this particular side group of wheels 22.

In accordance with the present invention a floating rail-sweeping block assembly is provided. This structure preferably is in the form of floating support means located above the rail 26 and includes a pair of transversely-spaced, elongated and longitudinally-extending members or straps 27 having portions lapping in juxtaposed relation portions of the inner and outer face sides of each of the wheels 22 to maintain this floating support means in general vertical alignment with the rail. Each floating support member 27 may be in the form of an elongated strip of steel plate and the inside faces thereof may, if desired, be provided with means to reduce frictional wear by contact with the rotating wheel structure, such as smears of grease. With respect to each of the wheels 22 there is provided at least one block 28 of fibrous material clamped between the elongated strap members 27.

Each block of fibrous material 28 preferably is in the form of a block of wood having the grain thereof running longitudinally so that end grain is exposed in the bottom end 29 of the block to be dragged along or swept over the rail 26. Such fibrous material should at least be of a character or relative softness as to be subject to wear by the steel rail and/or uniform protective coatings of fines on the rail to maintain the latter and do no damage to the rail in the thousands of trips back and forth along the latter.

The elongated strap members 27 are transversely tied together, preferably through tying means, such as bolts 30, as will be best understood from FIGS. 5, 6 and 7. Suitable means may be provided for preventing such bolts 30 from unduly loosening up, such as by the use of spot welding, fixing their heads and nuts 31 to adjacent outside faces of the straps 27, or, if desired, spacing sleeves about the shanks of the bolts between the straps and suitable split spring washers may be provided to prevent undue loosening. In any event, the transverse space between the pair of elongated floating straps 27 tightly receives therebetween each of the fibrous or wood blocks 28, which may be driven down therebetween until the lower end 29 of each block contacts the rail 26. It is a simple matter to so mount each drag block 28 with a proper extension of the bottom end 29 depending below the bottom edges of the straps 27 by placing strips of suitable thickness between the rail 26 and the bottom edges of these straps and then driving each block down to contact of its bottom end with the rail. For example, in a sawmill carriage embodiment, strips of wood one inch thick (1″ t.) may be employed for this purpose. Also, as the bottom ends 29 of the wood blocks 28 wear off in service so that the bottom edges of the elongated steel straps 27 gradually approach the top surface of the rail 26, this floating block assembly may be readily adjusted for further service by supporting the straps above the rail at the suitable elevated position with the insertion of such strips and then driving the worn blocks down further to contact of their bottom ends 29 with the top rail surface. This adjustment feature is illustrated in FIG. 14 wherein it is indicated that the bottom end 29 of drag block 28 has been worn off in service to drop the bottom edge of the elongated straps 27 to the full line position resulting in a minimum spacing indicated at (a). The straps 27 are then lifted to their original positions, indicated in dotted lines at 127 by insertion of the one inch thick strips to increase the spacing to that indicated at (b), and each of the drag blocks 28 is then driven down to contact its bottom end 29 again with the top surface of rail 26.

As will be seen in FIG. 2, and as is more understandably illustrated in FIG. 7, each drag block 28 preferably is provided with upwardly-extending, angularly-arranged end faces 32 and 132 extending obliquely across the top surface of rail 26 so as to clear the latter of chunks and lumpy refuse in travel with effective ploughing action. For this purpose, each of the blocks 28 may be rhomboid in transverse cross-section with such end faces 32 and 132 being arranged obliquely in opposite lateral directions, as shown. The resulting ploughing action will cause lumpy refuse dropped upon the top rail surface to be diverted inwardly to the inner side of the rail where it may be dropped through into a receiving space between the rails, to be cleared in any desired manner or fed to remote receiving means. Obviously, the rhomboid depending drag blocks 28 may be reversed so that their oblique end faces 32 and 132 may converge outwardly instead of inwardly, so that the resulting ploughing action thereof may clear the rail top surface to the outer side of the rail 26 rather than to the inner side thereof, where it may be cleared away by raker blade equipment hereinafter described.

It will be seen from FIGS. 1 and 2 that the side group of the aligned, longitudinally-spaced wheels 22 on the near side of the log carriage 20 provide a plurality of successive aligned pairs thereof with a plurality of the depending drag blocks 28 being located between and intervening each successive aligned pair of these wheels in this side group. Thus, the two wheels 22 shown in the left hand portion of FIGS. 1 and 2 constitute an aligned pair thereof which are intervened by two of the drag blocks 28, each of which is located in the near vicinity of one of the wheels, but longitudinally-spaced appreciably therefrom and out of contact therewith. This same condition applies with respect to the two middle wheels 22 constituting another aligned pair thereof. Likewise, the two aligned pairs of wheels 22 in the right side portion of FIGS. 1 and 2 have associated therewith in close proximity two depending drag blocks 28, but due to the greater spacing of this pair of aligned wheels an additional depending drag block 28 is inserted in an intermediate position.

The plurality of drag blocks 28 may have associated therewith lateral elongated guard plates 33. Each elongated guard plate 33 may be in the form of a strap or board resting upon the top ends of the depending drag blocks 28 which intervene each successive aligned pair of the wheels 22. Each elongated guard plate 33 preferably is securely fastened to the top ends of the depending drag blocks 28 over which it is lapped, and when such guard plates are in the form of wood strips, such fastening means may be in the form of nails 34, indicated in FIGS. 6 and 16, driven down through the lateral guard plate straps and into the top ends of the blocks. These elongated guard plates 33 thus, in addition to the weight of the depending drag blocks 28 themselves and the weight of the floating support means carrying them provided by the transversely-spaced elongated side straps 27 and their through tying means or bolts 30, load the drag blocks to bias their bottom ends 29 down against the top surface of the rail 26 or the uniform cemented coating of fines thereon. As a result, the over-all weight of the floating support and block assembly biases the drag blocks securely down upon the rail and its protective coating and smooths out the latter in travel.

The floating support and block assembly, comprising elongated side straps 27 and depending drag blocks 28, is tied to the carriage frame means 21 in such a manner as to permit free up and down relative motion while causing the assembly to be dragged along back and forth with travel of the carriage. This is attained by a loose connection or lost motion tying means which may comprise a structure having longitudinally-spaced, upwardly-extending surfaces and an intervening member slidably located therebetween for relative up and down motion, with one of said structure and member being fixedly carried by the carriage frame means 21 and the other being fixed to the floating assembly. As is illustrated in the drawings, and more particularly in FIGS. 8 to 10 incl. and 16, such loose connection or lost motion tying means may be in the form of a fork 35 fixed on the carriage frame means 21, or to the side of the I-beam sill 23 thereof, by any suitable means, such as a bolt 36. Such fork 35 may be in the form of a plate or strap carrying brackets 37 and 38, which, if desired, may be welded to the fork strap and designed to cooperate with the flanges of the I-beam sill 23 to shim out the fork strap to proper position and fix it in vertical location relative to the I-beam sill. The bottom end of fork strap 35 may be turned laterally outward and slotted to form a pair of longitudinally-spaced tangs 39, as will be seen from FIGS. 9, 10 and 16, thereby providing on the carriage frame means 21 the longitudinally-spaced, upwardly-extending surfaces which are defined by the inner edge faces of these spaced tangs. The lost motion tying means or loose connection also includes in the preferred form an upwardly-extending finger 40 fixed on the floating block support and slidably engaged between the spaced tangs 39. As will be understood from FIGS. 8 to 10 incl. and FIG. 16, such finger 40 may have a base portion 41 suitably clamped between the floating side straps 27 by any suitable means, such as one or more through bolts, one of which is indicated at 42. Two such bolts, as 42, spaced vertically and with both extending through base 41 of the linkage finger 40 will effectively prevent the latter from pivoting under applied drag force, although other conventional means may be employed for this purpose. Preferably, free relative up and down motion between the side edges of the finger 40 and the inside edges of the fork tangs 39 is assured by the provision of suitable lubricating means, which may be in the form of a pair of grease fittings 43 of conventional form, each having its check valve-equipped storage chamber connected with a through duct terminating at the inside edge face of each tang. Thus the floating support and drag block assembly is permitted free up and down motion relative to the carriage frame means 21 while being tied thereto to cause it to travel laterally therewith along the rail bed without undue lateral lost motion.

It will thus be understood that in the side group of wheels 22 all of the wheels except the two end ones have a pair of the depending drag blocks 38 located on opposite side edges thereof just ahead and just behind each wheel in spaced relation thereto with each of the end wheels having one of these depending drag blocks located in spaced relation thereto on its inward edge side which is opposed to the next adjacent wheel of this side group. In order to provide refuse clearing drag blocks to the outward side edges of the two end wheels for effective rail-clearing of refuse, so that these two end wheels will not be riding over lumpy or chunky refuse on the rail 26, additional end drag block assemblies 44 are provided with each mounted on one end of the carriage frame means, such as by attachment to an end of the I-beam sill 23.

Each such end drag block assembly 44 may comprise a rectangular depending sleeve which may be formed from a section 45 of U-shaped channel having a face plate 46 suitably secured, such as by welding, to the edges of the side flanges 47 of this section, so as to define a rectangular depending sleeve having open top and bottom ends, as will be best understood from FIGS. 3, 4, 13 and 15. Each of these rectangular depending sleeves of the end drag block assemblies 44 is preferably fastened to an end of the I-beam sill 23 by any suitable means, such as a through bolt 48, and suitable shim means, such as welded flanges 49 may be provided on the back of each sleeve to engage within the channel of the I-beam for cooperation with the bolt 48 for secure anchorage of each sleeve to the I-beam. Instead of the shim flanges 49 one may secure to the back face of channel 45 a C-shaped bracket having lateral top and bottom flanges to lap back over and under the top and bottom edges of the sill member 23, which is particularly useful since it will permit side nesting therein of any carriage frame sill member, whether it be an I-beam or square timber. The rectangular depending sleeve of each drag block end assembly 44 carries therein a drag block 228 which may be similar to each of the drag blocks 28 in being formed of readily wearable fibrous material, such as wood with the grain running lengthwise thereof. Thus, each end wheel 22 has located on its inward side edge one of the drag blocks 28 and located on its outward side edge one of the drag blocks 228, so that all of the wheels are provided on both side edges with rail-clearing drag blocks. Thus the end drag block assemblies 44 cooperate with the floating drag block assembly carrying the intervening drag blocks 28 to keep the top surface of the rail clear of lumpy and chunky refuse and to smooth out the protective cemented coating of fines.

Each of the drag blocks 228 may be made in the form of a plurality of wood strips wedged together down into its rectangular depending sleeve of each drag block assembly 44. While each drag block 228, either in the form of a single block or in the form of a plurality of parts, may be snugly fitted into its rectangular depending sleeve to be repeatedly driven down to accommodate wear of its lower end it may, if desired, be loosely fitted therein and weighted, such as by superimposed loading bodies suitably held in position by guide means forming part of or attached to the channel sections 45. Thus, for example, the face plate 46 may be extended upwardly the full length of the channel side flanges 47 of each drag block assembly 44 and into the open top end of the resulting rectangular depending sleeve a heavy weight of iron or lead may be loosely inserted therein to bear with appreciable force down upon the drag block 128 therein for continued biasing of the lower end of the latter upon the rail top surface.

It is desirable to provide such track cleaning means with refuse side clearing structure, to prevent undesirable lumpy and chunky refuse and fines from piling up excessively along the outer side of the rail 26 and eventually spilling inwardly over its top surface. Such refuse side clearing means may be in the form of a raker blade 50 which, as will be seen from FIGS. 1 to 4 incl. and 13, may have an inward edge 51 thereof fixed to or welded to face plate 46. Each fixed, transverse raker blade 50 has a depending bottom or lower end 52 which, as will be seen best from FIGS. 1, 3 and 13 located along the outer side and depending below the top portion of rail 26. Thus, as the carriage 20 is reciprocated or traveled back and forth along rail 26, the pair of transverse end raker blades 50 keep refuse cleared away from the outer side of the top portion of the rail.

As is indicated in FIG. 17, each such depending side clearing raker blade may be in a form so as to swing. Such modified form of raker blade, illustrated at 150, may have its top end 53 turned over to provide an eye through which is rotatably received a hinge pin 54 fixed to and extending laterally from the outer face of face plate 46 for swing along the side of the rail 26. Such eye is hidden behind a shown end washer 153, held in position by a cotter key 154. Swinging raker blade 150 has a lower end 152 which may be shaped to provide a curved lip that will readily dig into collected refuse when the carriage travels in a direction forward from its end, such as in the direction of the full line arrow 55 in FIG. 17. The pivoted raker blade 150 is held to its upright refuse-clearing position, shown in full lines in FIG. 17, by a suitable abutment means or stop pin 56, which may also be fixedly carried by the face plate 46. In reverse travel of the carriage, such as in the direction of the dotted arrow 57 in FIG. 17, the pivoted raker blade 150 may swing back and upwardly, such as to its dotted position 250 so that its lower end may be dragged back over the collecting refuse. This pivoted mounting of the raker blade 150 will assure that collecting refuse will be pushed forward ahead of the carriage beyond its path of travel, but will not rake back with it any refuse which has collected behind it, its lower tip 152 being swingable upwardly to drag over the refuse collecting behind it so that in the next travel it will push this refuse forward to beyond the end of the carriage travel. Such end drag block assemblies 144, one of which is illustrated in FIG. 17 for the right end of the carriage structure shown in FIGS. 1 and 2, may be used at both ends of the carriages for similar action. When such end drag block assemblies 144 are employed at both ends of the carriage structure their pivoted raker blades 150 will both swing backward in the relatively slow forward travel of the carriage during the carry forward into the saw of the log, or timber, being sawed. During the rapid return travel of the carriage both of these raker blades 150 will swing downwardly so that their scoop tips 152 will dig into and force thereahead in a rearward direction the refuse collected along the outer side of the rail, so that the raker blade on the back end of the carriage (which travels in a leading position back to the nigger and log deck) performs its clearing action both with respect to the refuse which fell along its path of travel and also as to the refuse which has been pushed back during return carriage travel by the pivoted raker blade on the front end of the carriage therefollowing. In the forward reverse travel of the carriage the pivoted raker blade 150 on the back end will drag up and over the pile of refuse which was pushed back by the pivoted raker blade on the front end of the carriage with rearward and upward swing, so as to travel forward therebeyond and then drop down to pick up this pile of refuse and push it farther back in the next return travel of the carriage. If desired, the drag block assembly 144 on the front of the carriage may differ from that illustrated in FIG. 17 for the rear end of the carriage, the difference being that the pivoted raker blade for the assembly 144 for the left end will be pivoted to the opposite side edge of the face plate 46 thereof and have its bottom tip turned to the left to scoop in the opposite direction, such as by merely turning over the blade 150 in mounting it upon pin 54. When it is realized that the travel of the carriage 20 in a sawmill is usually greater than the length of the carriage it will be understood that the use of such a pair of end drag block assemblies 144 equipped with such reversely pivoted raker blades 150 will effectively keep clear the refuse along the path of travel of the carriage in its reciprocative operation with pile up of refuse at the far forward and rearward ends of the travel path, for removal in any desired manner.

It is to be understood that any motive means may be employed for effecting reciprocative travel of carriage 20. Usually this is attained by reeling equipment from and upon which a suitable drive cable 58, anchored to the carriage, is unreeled and reeled, a section of such cable being illustrated in FIGS. 1 and 16. Such carriage driving equipment is under the control of and operated by the sawyer, as is the nigger which transfers the logs successively from the log deck to the carriage.

It is also desirable to provide additional guard means, in the form of a lateral ledge, along the side of the carriage frame 21 and located above the wheels 22 to prevent at least some of the refuse created on the carriage deck and by the action of the saw when it cuts through the log supported on the latter, from falling down upon the wheels and the clearing equipment associated therewith. Such guard ledge may be provided in the form of an elongated angle 59 having a vertical flange 60 fixed or bolted to web 61 of I-beam sill 23, and with its other flange 62 extending laterally over and above the wheels 22, such guard ledge being illustrated in FIG. 1 and shown in detail in FIGS. 11 and 12. In FIG. 13 is illustrated another form of such guard ledge which may be an elongated strap 159 anchored to the top outside flange 63 of the I-beam sill 23 by a plurality of suitable brackets or straps, one of which is illustrated at 64.

A further form of such guard ledge is illustrated in FIGS. 14 and 15. As therein shown, this guard ledge may be in the form of an elongated angle 259 having a lateral flange 262 suitably anchored at its ends by a pair of angle brackets 65 to the inward side flanges 47 of the end drag block assemblies 44. The elongated bracket 259 has a vertical flange 260 depending down beyond and lapping over the outer side of top sectors of the wheels 22, as shown. Such guard ledge structure 259 is found effectively to prevent a considerable proportion or practically all of the refuse developed on the carriage deck 24 from falling down in between the wheels, and to direct this refuse to the side of the rail where it may be effectively cleared away by the raker blades in either the fixed form of FIG. 13 or the pivoted form of FIG. 17. The drag blocks 28 and 228 keep the top rail surface clear of any small amount of such refuse that may be diverted or ricocheted thereto, and such refuse as may fly in that direction from the cutting action of the saw.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Track cleaning means for railway carriages comprising, in combination with a track including at least one rail and a carriage structure having frame means supported on the rail by at least two longitudinally-spaced and aligned rail-riding wheels; of floating support means located above the rail including a pair of transversely-spaced, elongated and longitudinally-extending members having portions lapping in juxtaposed relation portions of the inner and outer face sides of said wheels to maintain said floating support means in general vertical alignment with the rail; at least one block of fibrous material clamped between said elongated members longitudinally-spaced appreciably from and out of contact with said wheels and having a bottom end slidably resting upon the rail biased down there against by the weight of said floating support means and block; and loose connection means tying said floating support means to said carriage frame means for drag of said support means along the track with travel of said carriage structure while maintaining said block out of contact with said wheels, said loose connection means permitting free up and down motion of said floating support means relative to said carriage frame means.

2. The track cleaning means as defined in claim 1 characterized by the provision of a plurality of said fibrous blocks carried by and clamped between said elongated members of said floating support means with at least some of said blocks being located in the near vicinity of each of said wheels.

3. The track cleaning means as defined in claim 2 characterized by the carriage frame means being supported on the rail by a group of the aligned, longitudinally-spaced wheels providing a plurality of successive aligned pairs thereof, a plurality of said blocks being located between and intervening each successive aligned pair of the wheels; and a lateral, elongated guard plate mounted between each successive aligned pair of the wheels with its ends located in the vicinity of edge sides of the latter and with each guard plate supported on and carried by the top ends of the intervening blocks.

4. The track cleaning means as defined in claim 1 characterized by said block being clamped between said members only with frictional engagement therebetween permitting adjusting drive downward of said block relative to said members when the latter are supported in elevated positions to accommodate wear of the bottom end of said block.

5. The track cleaning means as defined in claim 1 characterized by said block having upwardly-extending, angularly-arranged end faces extending obliquely across the rail to clear the top surface of the latter with plowing action.

6. The track cleaning means as defined in claim 5 characterized by said block being rhomboid in transverse cross section with the opposite end faces being arranged obliquely in opposite lateral directions.

7. The track cleaning means as defined in claim 1 characterized by said loose connection means comprising structure having longitudinally-spaced, upwardly-extending surfaces and an intervening member slidably located therebetween for relative up and down motion, one of said structure and member being fixedly carried by said carriage frame means and the other being fixed to said floating support means.

8. The track cleaning means as defined in claim 2 characterized by a pair of depending hollow sleeves having open top and bottom ends and mounted on opposite ends of said carriage frame means above the rail; a fibrous block mounted in each sleeve and having a bottom end slidably resting upon the rail; and a downwardly-extending, side clearing raker blade carried by each sleeve having a lower end located along one side of the rail and juxtaposed in spaced relation thereto.

9. Track cleaning means for sawmill railway log carriages comprising, in combination with a track including a pair of laterally-spaced rails and a carriage structure having an elongated frame supported on the rails by a plurality of longitudinally-spaced sets of paired wheels providing a relatively large group of longitudinally-spaced and aligned wheels on each side of said frame; of an elongated floating block support in the form of a pair of laterally-spaced, long rigid straps mounted on one side of said frame above one of the rails in association with one of the groups of wheels; a plurality of through tying means transversely tying said straps together, said laterally-spaced straps being mounted on opposite face sides of the wheels of said group and lapping inner and outer face side portions thereof in closely juxtaposed relation whereby said wheels assure maintenance of said support in alignment with said rail; a plurality of longitudinally-spaced blocks frictionally clamped between said straps and drivable downwardly therebetwen, each block having a bottom end extending below said straps and slidably resting upon said rail with said blocks being biased down against said rail by the weight of said floating support and block assembly; a loose connection tying said floating block support to said frame in the form of a fork fixed on said frame and having a pair of longitudinally-spaced tangs, said loose connection including an upwardly-extending finger fixed on said floating block support slidably engaged between said tangs; each of said wheels in said group except the two end ones having a pair of said blocks located on opposite edge sides thereof just ahead and just behind it in spaced relation thereto with each of the end wheels having one of said blocks located in spaced relation thereto on its inward edge side opposed to the next adjacent wheel of said group; a pair of rectangular depending sleeves each having open top and bottom ends with one carried on each end of said frame above said rail in the near vicinity of one of said end wheels and on the outward edge side of the latter opposite its inward edge side; a pair of fibrous blocks with one slidably mounted in each of said sleeves and having a bottom end slidably resting upon the rail so that each end wheel is flanked on its inward and outward edge sides by one of the floating support blocks and one of the sleeve-carried blocks; and a pair of depending, side clearing raker blades each disposed in a transverse plane and carried by one of said sleeves with each blade having a lower end located along the outer side of the rail and juxtaposed in spaced relation thereto.

10. The track cleaning means as defined in claim 9 characterized by one of said raker blades having its upper portion pivotally mounted to its supporting depending sleeve for swing along the outer side of the rail, said supporting depending sleeve having a stop to which said swinging raker blade is abutted in an upright refuse-clearing position when said carriage structure travels in a direction toward the end of its frame on which said swinging raker blade is mounted while permitting the lower end of said blade to swing upwardly for drag over such refuse in reverse travel of said carriage structure.

11. The track cleaning means as defined in claim 9 characterized by a longitudinally-extending guard ledge mounted on said elongated carriage frame and having a lateral flange superposed above the side group of wheels, said guard ledge having a depending flange extending down over top sectors of said wheels to the outer sides thereof and spaced outwardly therefrom.

References Cited in the file of this patent

UNITED STATES PATENTS

| | | |
|---|---|---|
| 841,552 | Hoops | Jan. 15, 1907 |
| 965,013 | Reitz | July 19, 1910 |
| 1,013,078 | Simon | Dec. 26, 1911 |
| 1,174,835 | Durkee et al. | Mar. 7, 1916 |